US010706169B1

(12) United States Patent
Wagner et al.

(10) Patent No.: US 10,706,169 B1
(45) Date of Patent: Jul. 7, 2020

(54) QUARANTINING STORAGE OBJECTS USING A QUARANTINE LIST

(71) Applicant: EMC IP Holding Company LLC, Hopkinton, MA (US)

(72) Inventors: Michael Paul Wagner, Raleigh, NC (US); Michael C. Brundage, Cary, NC (US); Alan L. Taylor, Cary, NC (US); Michael J. Noeth, Cary, NC (US); Peter J. McCann, Mason, NH (US); Steven A. Morley, Mendon, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 5 days.

(21) Appl. No.: 16/237,128

(22) Filed: Dec. 31, 2018

(51) Int. Cl.
| G06F 12/14 | (2006.01) |
| G06F 21/62 | (2013.01) |
| G06F 21/60 | (2013.01) |
| H04L 29/08 | (2006.01) |
| G06F 11/20 | (2006.01) |
| G06F 16/907 | (2019.01) |

(52) U.S. Cl.
CPC ...... *G06F 21/6218* (2013.01); *G06F 11/2064* (2013.01); *G06F 12/1483* (2013.01); *G06F 16/907* (2019.01); *G06F 21/604* (2013.01); *H04L 67/1097* (2013.01); *G06F 2201/82* (2013.01)

(58) Field of Classification Search
None
See application file for complete search history.

(56) References Cited

U.S. PATENT DOCUMENTS

| 9,916,191 B1 | 3/2018 | Pan et al. |
| 9,933,953 B1 | 4/2018 | Taylor et al. |
| 10,180,790 B1 | 1/2019 | Taylor et al. |

OTHER PUBLICATIONS

Nagasimha Haravu, et al.; "Unified Approach to Import, Replication, and Migration of a Storage Volume," U.S. Appl. No. 16/049,148, filed Jul. 30, 2018.

Qiu Shang, et al.; "Preserving Replication to a Storage Object on a Storage Node," U.S. Appl. No. 16/175,162, filed Oct. 30, 2018.

*Primary Examiner* — Kevin Verbrugge
(74) *Attorney, Agent, or Firm* — BainwoodHuang (57) ABSTRACT

Techniques are presented for implementing a scalable approach to keeping track of the metadata validity of persistently-stored metadata for storage objects. In contrast with prior approaches, improved techniques only store a list of the invalid (or quarantined) objects rather than all objects regardless of validity of their metadata. Under normal circumstances, only a small number of storage objects are invalid at any given time, as the system generally takes steps to repair the invalid objects in the normal course of operation. Thus, the number of invalid objects tends to be small, barring some catastrophic system failure. Only a small amount of expensive privileged persistent storage is therefore needed. A health level may also be used to indicate many failures, indicative of catastrophic system failure.

15 Claims, 4 Drawing Sheets

QUARANTINING STORAGE OBJECTS USING A QUARANTINE LIST

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices Some data storage systems implement certain storage features, such as mirrors, as storage objects. Thus, for example, a particular mirror implemented as a storage object may mirror data writes directed to a primary logical disk so that the data is also written to a secondary logical disk. Metadata associated with each such storage feature may be persisted within a metadata database, which is stored in the array of non-volatile data storage devices, so that the storage feature may continue to operate after a reboot or after the object is removed from memory.

SUMMARY

Unfortunately, conventional data storage appliances may experience limitations. For example, if a storage processor is unable to persist the metadata for a particular storage object to the metadata database, the storage feature for that storage object may fail to operate correctly after the appliance reboots, because the persistent version of the metadata has become inconsistent with the actual, current state of the storage feature. Such inconsistencies may arise, for example, if the storage processor has a faulty connection to parts of the array, if there is data corruption on disk, or if a locking mechanism prevents the storage processor from modifying the metadata in question.

It is possible to avoid negative consequences of such inconsistencies by storing a validity list for every storage object that resides in the data storage system (or for every storage object that represents a storage feature). For example, if a storage processor is unable to persist a metadata update to the metadata database for a particular storage object, then the storage processor could change that storage object from being listed as valid on the validity list to being listed as invalid. To avoid a scenario in which the validity list itself cannot be written to, the validity list may be kept in separate storage to which that the storage processor has privileged access. For reliability, the validity list may be stored in triple-mirrored storage, which is expensive. But, as the validity list would store the validity of every storage object in the system, the amount of expensive triple-mirrored persistent storage needed to accommodate the validity list would tend to grow in proportion to the system size, eventually reaching a point where the cost of the triple-mirrored persistent storage would become excessive.

In order to address this deficiency, it would be desirable to implement a more scalable approach to keeping track of the metadata validity of persistently-stored metadata for storage objects. This may be accomplished by limiting persistent, triple-mirrored storage to a list of invalid objects rather than including all objects in the system. Under normal circumstances, only a small number of storage objects are invalid at any given time, as the system generally takes steps to repair invalid objects in the normal course of operation. Thus, the number of invalid objects tends to be small, barring some catastrophic system failure. Only a small amount of expensive triple-mirrored persistent storage is therefore needed. In some examples, failures of a large number of storage objects are addressed by providing a health level to indicate many failures, which would be too many to fit in the small amount of triple-mirrored storage available. For example, if a large number of failures is observed, the health level may be set to a value that signals a catastrophic failure, which would mean that every object in the system is suspect. The improved approach thus efficiently addresses the usual case, where only a small number of failures occur, and provides a health level to address the unusual case, where many failures occur. The improved approach is thus efficient and cost-effective without sacrificing functionality.

In one embodiment, a method performed by processing circuitry of a data storage system (DSS) for selectively providing access to multiple storage features of the DSS represented by respective memory-resident storage objects is provided. The method includes (1) receiving a first request to access a first storage feature, and, in response, (a) providing access to the first storage feature, including making a first change to metadata describing the first storage feature in its memory-resident storage object, and (b) storing the first changed metadata within a metadata database (MDDB) on first persistent storage of the DSS; (2) receiving a second request to access a second storage, and, in response, (a) providing access to the second storage feature including making a second change to metadata describing the second storage feature in its memory-resident storage object, (b) making an attempt to store the second changed metadata within the MDDB on the first persistent storage, the attempt failing, and (c) in response to the attempt failing, storing an identifier of the storage object representing the second storage feature to a quarantine list on second persistent storage of the DSS distinct from the first persistent storage; and (3) subsequently, receiving a third request to access the second storage feature, and, in response, (a) finding that the quarantine list identifies the storage object representing the second storage feature and (b) in response to finding, denying access to the second storage feature due to it being quarantined. Systems, apparatuses, and computer program products for performing similar methods are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for implementing a more scalable approach to keeping track of the metadata validity of persistently-stored metadata for storage objects. In contrast with prior approaches, improved techniques limit persistent, triple-mirrored storage to a list of invalid objects rather than including all objects in the system. Under normal circumstances, only a small number of storage objects are invalid at any given time, as the system generally takes steps to repair invalid objects in the normal course of operation. Thus, the number of invalid objects tends to be small, barring some catastrophic system failure. Only a small amount of expensive triple-mirrored persistent storage is therefore needed. In some examples, failures of a large number of storage objects are addressed by providing a health level to indicate many failures, which would be too many to fit in the small amount of triple-mirrored storage available. For example, if a large number of failures is observed, the health level may be set to a value that signals a catastrophic failure, which would mean that every object in the system is suspect. The improved approach thus efficiently addresses the usual case, where only a small number of failures occur, and provides a health level to address the unusual case, where many failures occur. The improved approach is thus efficient and cost-effective without sacrificing functionality.

Figure 1:
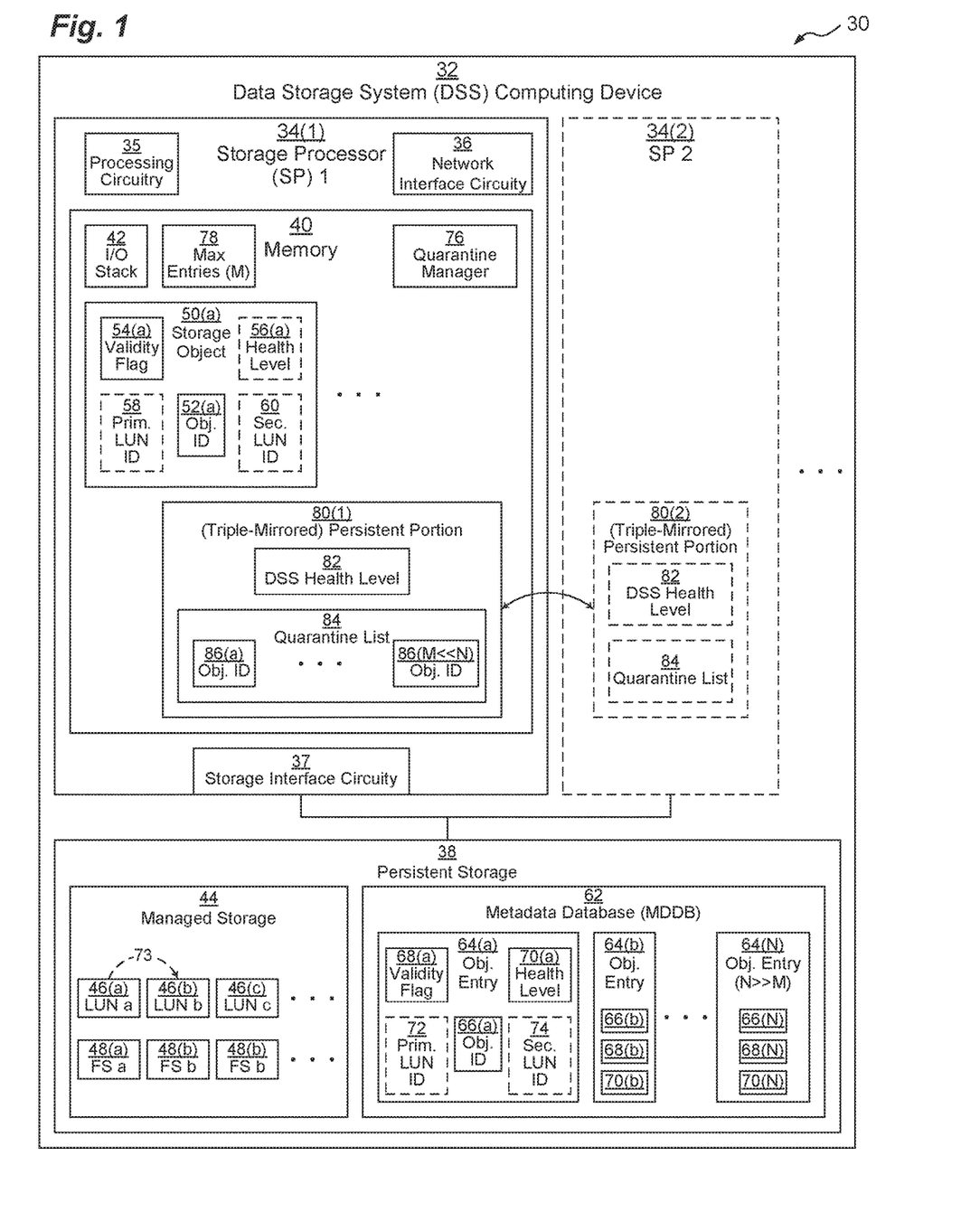
FIG. 1 is a block diagram depicting an example system and apparatus for use in connection with various embodiments.

FIG. 1 depicts an environment 30 including a data storage system (DSS) computing device 32. DSS computing device 32 may connect to one or more host devices configured to send I/O requests to the DSS computing device 32 for fulfillment.

DSS Computing device 32 may be any kind of computing device capable of servicing I/O requests, such as, for example, a personal computer, workstation, server computer, enterprise server, data storage system (DSS) rack server, laptop computer, tablet computer, smart phone, mobile computer, etc. In one example, DSS computing device 32 is a DSS rack server, such as, for example, a VNX, VNXe, VMAX, or Cyclone data storage system produced by Dell/EMC of Hopkinton, Mass.

As depicted, DSS computing device 32 includes one or more storage processors (SPs) 34 (depicted as SPs 34(1), 34(2), . . . ) connected to persistent storage 38. Each SP 34 includes various computing device components mounted on a circuit board (not depicted). Each SP 34 may be separately mounted within a single server rack (e.g., a 42U server rack), also being connected to the other SP(s) 34 and persistent storage 38 via interconnection circuitry, such as, for example, a set of Fibre Channel or Ethernet cables mounted on the server rack.

The first SP 34(1) will herein be described. It should be understood that the other SPs 34 (if any) may have a similar structure.

SP 34(1) includes processing circuitry 35, storage network interface circuitry 36, storage interface circuitry 37, and memory 40. SP 34(1) may also include other components as are well-known in the art.

Processing circuitry 35 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface 37 provides access and an interface to a connection to drives (not depicted) of persistent storage 38. Storage interface 37 may also control the drives. Any kind of connection over which SP 34(1) can communicate with drives may be used, such as, for example, Ethernet cables, Wireless Fidelity (Wi-Fi) wireless connections, an IP network, SCSI cables, SATA cables, Fibre Channel (FC) cables, etc. Storage interface circuitry 37 may include for example, SCSI, SAS, ATA, SATA, FC, and/or other similar controllers and ports.

The drives of persistent storage 38 may include any kind of persistent storage devices, such as, for example, hard disk drives, solid-state storage devices, flash drives, etc. The drives may be arranged in an array configuration, such as for example a traditional RAID array or a Mapped RAID array.

Network interface circuitry 36 may include, for example, one or more Ethernet cards, cellular modems, FC adapters, Wi-Fi wireless networking adapters, and/or other devices for connecting to a network (not depicted).

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores an input/output (I/O) stack 42 in operation. I/O stack 42 allows I/O requests (not depicted) from external hosts (as well as local applications) to be processed with respect to managed storage 44 of the persistent storage 38 by the SP 34(1).

Managed storage 44 makes up the majority of the persistent storage 38. Managed storage 44 includes logical disks, including a set of logical volumes (LUNs) 46 (depicted as LUNs 46(a), 46(b), 46(c), . . . ) and a set of filesystems (FSes) 48 (depicted as FSes 48(a), 48(b), 48(c), . . . ). These logical disks 46, 48 are managed by I/O stack 42 and are assigned to hosts or to applications running on the DSS computing device 32 itself to store user data or application data as is well-known in the art.

Memory 40 also stores a set of storage objects 50 (depicted as storage objects 50(a), . . . ), which represent particular features provided by the DSS computing device 32 with respect to the managed storage 44. For example, in one embodiment, storage object 50(a) represents a mirror 73 between a primary LUN 46(a) and a secondary LUN 46(b), such that all data written to primary LUN 46(a) is mirrored onto secondary LUN 46(b) during the normal course of operation (i.e., unless an error occurs). In some embodiments, not depicted, mirror 73 may include, as one of the LUNs 46 involved in the mirroring relationship, a LUN 46 that is located off of the DSS computing device, such that the mirror 73 implements remote replication. In some embodiments, not depicted, mirror 73 may mirror between filesystems 48 rather than between LUNs 46.

Each storage object 50 includes a respective object identifier (ID) 52 as well as various metadata that describes the storage feature, allowing it to run properly. For example, each storage object also includes a validity flag 54 that indicates a current state of the storage feature (e.g., whether its metadata is currently in a consistent state, in which case it may be in condition to operate correctly). In some embodiments, each storage object 50 also includes a health level 56. Each storage object also contains additional metadata that is used in operation of the storage feature. For example, storage object 50(a) representing mirror 73 includes a primary LUN ID 58 that identifies the primary LUN 46(a) from which data is mirrored and a secondary LUN ID 60 that identifies the secondary LUN 46(*b*) to which data is mirrored. It should be understood that other types of storage features may include different metadata within their respective storage objects 50.

There may be a large number of storage features implemented by the DSS computing device 32, such as, for example, in excess of a million. It may not be feasible to constantly store more than a million storage objects 50 within memory 40 of any given SP 34 at any given time, however. Thus, some storage objects 50 may only be memory-resident within memory 40 of one SP 34 at a time, while others may be memory-resident within memory 40 of several SPs 34 at once. It is also possible that some storage features that are seldom accessed may not currently include any memory-resident storage object 50 as long as they remain unaccessed. In order to allow an appropriate memory-resident storage object 50 to be created and stored within memory 40 of an SP 34 as needed, the metadata of all of the storage features are persistently stored within a metadata database (MDDB) 62 on persistent storage 38. Thus, MDDB includes a set of object entries 64 (depicted as object entries 64(*a*), 64(*b*), . . . , 64(N)), with each object entry corresponding to a particular storage feature, regardless of whether that storage feature currently has a corresponding memory-resident storage object 50 within memory 40 of any SP 34. As depicted, each object entry 64 includes an object ID 66 (corresponding to object ID 52), a validity flag 68 (corresponding to validity flag 54), and a health level 70 (corresponding to health level 56). In addition, each storage entry 64 also contains additional metadata that is used in operation of its associated storage feature. For example, storage entry 64(*a*) representing mirror 73 includes a primary LUN ID 72 (corresponding to primary LUN ID 58) and a secondary LUN ID 74 (corresponding to secondary LUN ID 60).

In some embodiments, as depicted, MDDB 62 is stored on the same persistent storage 38 that is used for the managed storage 44. Thus, individual blocks of the MDDB 62 and of the managed storage 44 may be commingled on the various drives of the persistent storage 38.

It is important that each memory-resident storage object 50 with a given object ID 52 be maintained so that its respective metadata 54, 56, 58, 60 is in synchronization with the corresponding metadata 68, 70, 72, 74 of the object entry 64 having the same object ID 66. Thus, any time I/O stack 42 on any given SP 34 needs to update the metadata of a particular memory-resident storage object 50, that SP 34 immediately attempts to update the metadata on the corresponding object entry 64 in the MDDB 62 on persistent storage 62.

However, if it happens that an SP 34 fails to successfully update the metadata on the corresponding object entry 64 in the MDDB 62 on persistent storage 62 after making a change to the metadata on a memory-resident storage object 50, then it is important that the fact that the metadata is inconsistent be persistently recorded so that that knowledge cab survive a reboot. Thus, if that happens, quarantine manager 76 operates to persistently quarantine the storage object 50 until the metadata can be synchronized between the correct memory-resident storage object 50 and the incorrect object entry 64 within the MDDB 62. Upon being quarantined, certain kinds of access to the storage feature may be disallowed. For example, in the case of a mirror (e.g., mirror 73), being quarantined means that writes to the mirror will not be allowed (although, in some embodiments, reads may still be permitted, but they may be restricted, for example, to only be fulfilled from the primary LUN).

Quarantine manager 76 operates to quarantine a storage feature associated with a particular storage object 50(*a*) by first attempting to place the corresponding object ID 52(*a*) on a quarantine list 84 on special persistent storage portion 80 of memory 40. Special persistent storage portion 80 is independent of persistent storage 38. In some embodiments, special persistent storage portion 80 is triple-mirrored to ensure reliability. In some embodiments, special persistent storage portion 80 is stored on flash memory directly attached to the SP 34. Thus, in one embodiment, each SP 34 separately includes its own special persistent storage portion 80 as a small amount of dedicated triple-mirrored flash memory. In this embodiment, the special persistent storage portion 80 is also mirrored between the various SPs 34 so that each SP 34 has an updated copy of the quarantine list 84.

In order to minimize the amount of special persistent storage portion 80 that is needed even as the number of storage features scales up (since this special persistent storage portion 80 may be expensive and since it may be resource-intensive to continuously mirror large amounts of data between the SPs 34), the quarantine list 84 is kept small. Thus, the quarantine list 84 may be configured to store no more than a maximum number (M) 78 of object IDs 86. In an example embodiment, each object ID 86 is 32 bits long and there a maximum of eight object IDs 86 may be stored within quarantine list 84 (i.e., M=8); in such an embodiment, the quarantine list 84 only requires 32 bytes of memory. In other embodiments, M may have another value, provided however that M is significantly smaller than N (the total number of storage features). Thus, in some embodiments, M may range from four to sixteen. In other embodiments, M may be somewhat larger (e.g., M=1000), provided that the total amount of special persistent storage portion 80 per SP 34 is kept below a target size (e.g., 1 kilobyte, 4 kilobytes, 64 kilobytes, etc.).

Because the size of the quarantine list 84 is limited, it is possible that the quarantine list 84 can become full, which could prevent the quarantine manager 78 from properly quarantining a storage object 50 when necessary. Although such a situation is likely to be rare (since storage objects 50 are removed from quarantine when possible), it could happen in the event of a catastrophic failure (e.g., the failure of an important piece of hardware such as a drive of persistent storage 38 or a cable connecting some of the persistent storage 38 to an SP 34). Thus, in order to prevent a situation in which a quarantine cannot be recorded, quarantine manager 76 may also operate to record a DSS health level 82 within the special persistent storage portion 80 and to maintain separate health level labels 70 within each object entry 64 of the MDDB 62.

In one embodiment, the DSS health level 82 is a numeric counter that is initially set to an initial value (e.g., 1). The value of the DSS health level 82 is then used to set the health level 70 of every object entry 64 when that object entry 64 is created or modified. In one embodiment, the value of the DSS health level 82 is used as the health level 70 of an object entry 64, while in another embodiment the value of the DSS health level 82 minus one is used as the health level 70 of an object entry 64.

Any time I/O stack 42 attempts to access an object entry 64 (e.g., to initially read it from the MDDB 62 when first loading the corresponding storage object 50 into memory 40; to update any metadata value 68, 72, 74 within the object entry 64; to initially allow any kind of access to the storage feature that might result in updating a metadata value 68, 72,

74; etc.), it first checks with quarantine manager 76 to determine whether or not that object entry 64 has been quarantined. Quarantine manager 76 is able to do this by checking for the corresponding object ID 66 on the quarantine list 84 and, if not found there, by comparing the health level 70 to the DSS health level 82. If the health level 70 and the DSS health level 82 are the same (or, in another embodiment, if the DSS health level 82 exceeds the health level 70 by more than one), then the object entry 64 is known to be up-to-date and not subject to a system-wide quarantine. Otherwise, the object entry 64 is deemed to be quarantined, and I/O stack 42 is denied access to the object entry 64 until its metadata 68, 72, 74 can be checked for validity (and corrected if necessary). This may result in access to the storage feature being denied, at least temporarily.

Any time quarantine manager 76 is unsuccessful at attempting to place an object ID 52(a) on the quarantine list 84 as part of quarantining the associated storage object 50 due to the quarantine list 84 being full (i.e., the quarantine list already stores M object IDs 86), quarantine manager 76 increments (or otherwise updates) the value of the DSS health level 82 within the special persistent storage portion 80. This results in every object entry 64 being quarantined since the health level 70 of every object entry 64 is now too low.

In some embodiments, quarantine manager 76 is part of I/O stack 42, and in other embodiments, quarantine manager 76 operates as an external driver called by I/O stack 42 as needed.

In some embodiments, memory 40 may also include another persistent storage portion (not depicted). This other persistent storage portion of memory 40 may be made up of one or more persistent storage devices, such as, for example, disks. Other persistent storage portion of memory 40 or persistent storage 38 is configured to store programs and data even while the DSS computing device 32 or an SP 34 is powered off. The OS and the applications and drivers 42, 76 are typically stored in this other persistent storage portion of memory 40 or on persistent storage 38 so that they may be loaded into a system portion of memory 40 upon a restart. These applications and drivers 42, 76, when stored in non-transient form either in the volatile portion of memory 40 or on persistent storage 38 or in the other persistent portion of memory 40, form a computer program product. The processing circuitry 35 running one or more of these applications or drivers 42, 76 thus forms a specialized circuit constructed and arranged to carry out the various processes described herein.

Figure 2:
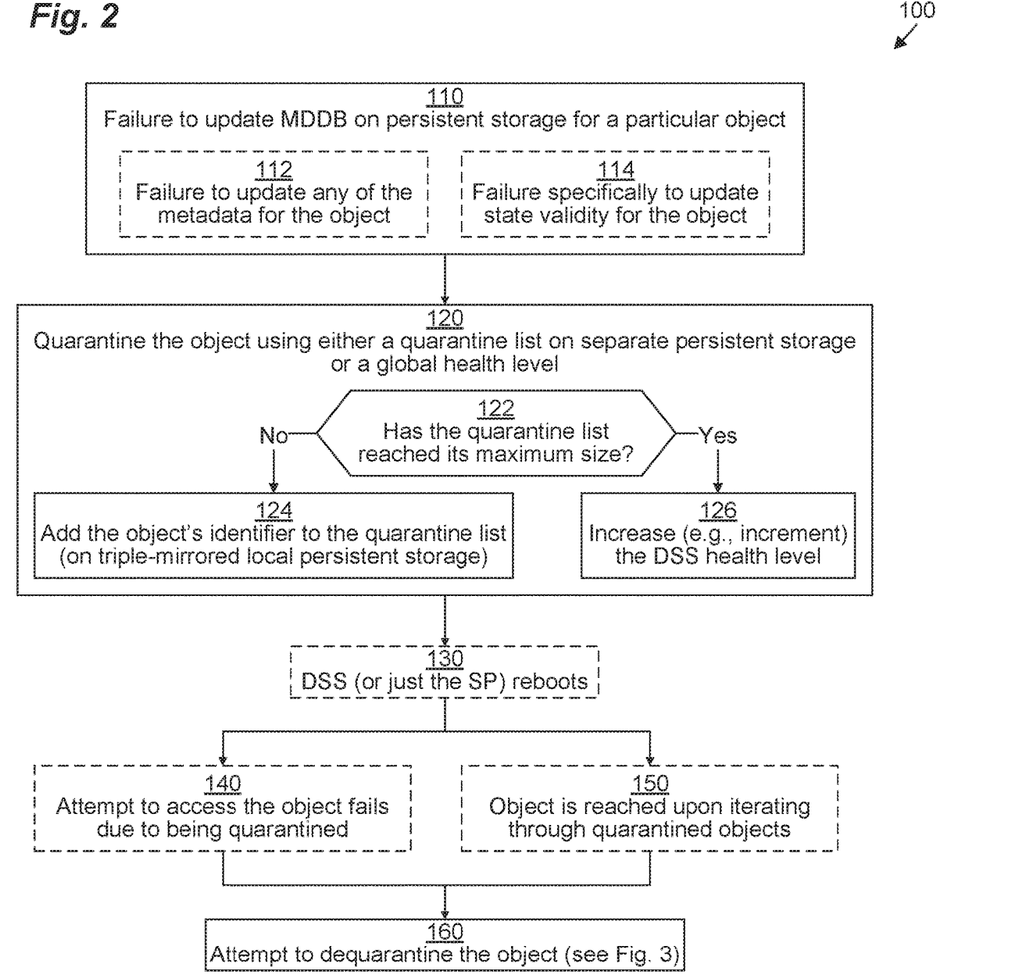
FIG. 2 is a flowchart depicting example methods according to various embodiments.

FIG. 2 illustrates an example method 100 performed by I/O stack 42 and quarantine manager 76 running on a DSS computing device 32 for managing a quarantine state of various storage objects representing storage features of the DSS computing device 32. It should be understood that any time a piece of software (e.g., I/O stack 42, quarantine manager 76, OS, etc.) is described as performing a method, process, step, or function, in actuality what is meant is that a computing device (e.g., DSS computing device 32 or one of its constituent SPs 34) on which that piece of software is running performs the method, process, step, or function when executing that piece of software on its processing circuitry 35. It should be understood that one or more of the steps or sub-steps of method 100 may be omitted in some embodiments. Similarly, in some embodiments, one or more steps or sub-steps may be combined together or performed in a different order. Steps and sub-steps 112, 114, 130, 140, and 150 of method 100 marked with dashed lines may be deemed to be either optional or representative of alternative embodiments. Method 100 is performed by computing device 32.

In step 110, I/O stack 42 operating on a particular SP 34 (e.g., SP 34(1)) fails to successfully update the MDDB 62 on persistent storage 62 in connection with a particular storage object 50 that represents a particular storage feature that was just accessed by the I/O stack 42. In one embodiment, step 110 includes sub-step 112, while in another embodiment, step 110 includes sub-step 114.

In sub-step 112, after I/O stack 42 updates any of the metadata 54, 58, 60, etc. of a memory-resident storage object 50 due to accessing the storage feature, I/O stack 42 fails to successfully update the corresponding metadata 68, 72, 74, etc. for the object entry 64 whose object ID 66 is the same as the object ID as the memory-resident storage object 50. Thus, if the storage feature is mirror 73 and the I/O stack 42 just updated the secondary LUN ID 60 within memory-resident storage object 50(a) to point to LUN 46(c) rather than to 46(b) but I/O stack 42 was unable to similarly update the secondary LUN ID 74 within object entry 64(a) of MDDB 62 to point to LUN 46(c) rather than to 46(b), then that would be an example of sub-step 112.

In sub-step 114, after I/O stack 42 updates the validity flag 54 of a memory-resident storage object 50 due to accessing the storage feature, I/O stack 42 fails to successfully update the corresponding validity flag 68 for the object entry 64 whose object ID 66 is the same as the object ID as the memory-resident storage object 50. Thus, in one example of sub-step 114, if the storage feature is mirror 73, I/O stack 42 may have just sent a write command to the mirror 73. Then, although the write may have successfully completed on primary LUN 46(a), the write was unable to be successfully mirrored onto secondary LUN 46(b). At that point, since the primary LUN 46(a) and the secondary LUN 46(b) no longer contain matching data, the mirror 73 is considered to be in an inconsistent or invalid state. Therefore, I/O stack 42 updates the validity flag 54(a) for the memory-resident storage object 50(a) of the mirror 73 to be false (instead of being true, as it was before). However, for some reason, I/O stack 42 is unable to similarly update the validity flag 68(a) within object entry 64(a) of MDDB 62 to be false, so it remains set to a true value.

In response to step 110, I/O stack 42 directs quarantine manager 76 to perform step 120. It should be understood that in some embodiments, sub-step 112 may trigger step 120, while in other embodiments only sub-step 114 triggers step 120.

In step 120, quarantine manager 76 quarantines the storage object 50 (also referred to as quarantining the corresponding storage feature or quarantining the corresponding object entry 64) by making reference to the quarantine list 84 in special persistent storage portion 80, and, depending on the situation, by also modifying the DSS health level 82 in special persistent storage portion 80. Step 120 is typically performed by performing sub-steps 122-126.

In sub-step 122, quarantine manager 76 determines whether or not the quarantine list 84 already contains the maximum number (M) 78 of object IDs 86. If it does, then the quarantine list 84 is full, so operation proceeds with sub-step 126. Otherwise, there is room in the quarantine list 84, so operation proceeds with sub-step 124.

In sub-step 124, quarantine manager 76 adds the object ID 52 from the storage object 50 being quarantined to an empty spot on the quarantine list 84 in the special persistent portion 80 of memory 40 (which may be locally triple-mirrored and/or mirrored onto the other SP(s) 34).

Alternatively, in sub-step 126, since the quarantine list 84 is full, quarantine manager 76 increases the value (e.g., by incrementing) of the DSS health level 82 stored in the special persistent portion 80 of memory 40 (which may be locally triple-mirrored and/or mirrored onto the other SP(s) 34). This has the effect of implicitly quarantining every object entry 64 within the MDDB 62 since the health levels 70 in those object entries 70 are now all too low.

After step 120, whether or not the SP 34 or the DSS computing device 32 reboots (or, e.g., restarts due to a loss of power) in optional step 130, the object entry 64 (or many object entries 64 if the DSS health level 82 was updated) remains quarantined because information in the special persistent portion 80 of memory 40 can be used to determine whether or not any storage object 50 that is being newly-loaded into memory 40 from the MDDB 64 has been quarantined.

In some embodiments, at some later point in time, I/O stack 42 may later attempt to access the storage object 50 that has just been quarantined, but the access will fail (step 140) due to being quarantined (see below in connection with FIG. 4).

In some embodiments, at some later point in time, quarantine manager 76 may later iterate through a list of quarantined object entries 64 in an attempt to rectify the problems (step 150). Thus, for example, quarantine manager 76 may iterate through the object entries 64 with object IDs 66 that match the object IDs 86 on the quarantine list 84. As another example, quarantine manager 76 may periodically iterate through the all object entries 64 in case of a system-wide quarantine due to the DSS health level 82 being incremented.

Step 160 is performed on a particular object entry 64 in response to either step 140 or 150. In step 160, quarantine manager 76 attempts to dequarantine the object entry 64 in question. See below in connection with FIG. 3 for more details.

Figure 3:
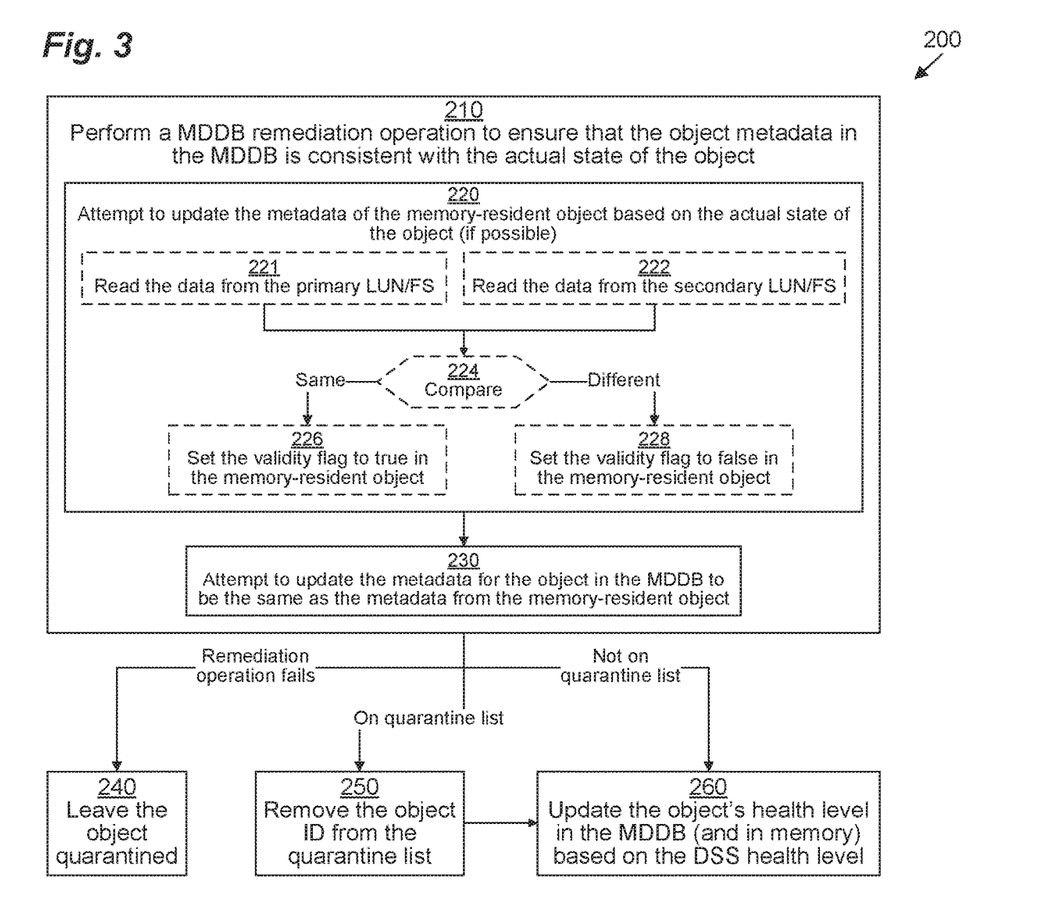
FIG. 3 is a flowchart depicting example methods according to various embodiments.

FIG. 3 illustrates an example method 200 performed by I/O stack 42 and quarantine manager 76 running on a DSS computing device 32 for attempting to dequarantine an object entry 64. Step 160 of method 100 may be implemented in accordance with method 200 as described in connection with FIG. 3. It should be understood that one or more of the steps or sub-steps of method 200 may be omitted in some embodiments. Similarly, in some embodiments, one or more steps or sub-steps may be combined together or performed in a different order. Sub-sub-steps 221-228 of method 200 marked with dashed lines may be deemed to be either optional or representative of alternative embodiments. Method 200 is performed by computing device 32.

In step 210, I/O stack 42 operating on a particular SP 34 (e.g., SP 34(1)) performs an MDDB remediation operation to ensure that the metadata 68, 72, 74 of a particular object entry 64 (e.g., object entry 64(a)) in the MDDB 62 is consistent with an actual state of the feature (e.g., mirror 73) represented by that object entry 64. Step 210 may be implemented by sub-steps 220 and 230, as described below.

In sub-step 220, I/O stack 42 attempts to update the metadata 54, 58, 60 of the memory-resident storage object 50 that corresponds to the particular object entry 64 being remediated. There are various ways that sub-step 220 may be performed, depending on the nature of the feature and the particular embodiment, but, generally, the metadata (e.g., metadata 54, 58, 60, but possibly including other metadata not shown instead) of the storage object 50 is regenerated by carefully examining data relating to that feature within the managed storage 44 as well as any other relevant information. In some circumstances, it may not be possible to regenerate all of the metadata, in which case the validity flag 54 for that object entry 50 is set to false. In other circumstances, even if all of the metadata aside from the validity flag 54 can be regenerated, the validity flag 54 may still be set to be false if it is determined that the feature is in an inconsistent state. For example, in the context of a storage object 50 such as storage object 50(a) representing mirror feature 73, sub-sub-steps 221-228 may be performed.

In sub-sub-step 221, assuming the primary LUN ID 58 and the secondary LUN ID 60 can be recovered from the corresponding object entry 64(a) or by some other means, I/O stack 42 reads some or all of the data stored within the primary LUN 46(a) in managed storage 44 identified by the primary LUN ID 58. In sub-sub-step 222, I/O stack 42 also reads some or all of the data stored within the secondary LUN 46(b) in managed storage 44 identified by the secondary LUN ID 60. Then, in sub-sub-step 224, I/O stack 42 compares the data read in sub-sub-steps 221 and 222 and determines whether or not they are the same. If they are the same (for all data), then, in sub-sub-step 226 I/O stack 42 sets the validity flag 54(a) to a true value because the primary LUN 46(a) and the secondary LUN 46(b) are in a state consistent with proper operation of the mirror 73. However, if the comparison of sub-sub-step 224 failed, then in sub-sub-step 228 I/O stack 42 sets the validity flag 54(a) to a false value because the primary LUN 46(a) and the secondary LUN 46(b) are not in a state consistent with proper operation of the mirror 73 (e.g., the secondary LUN 46(b) has not yet been updated with all writes that were sent to and recorded on the primary LUN 46(a)).

After sub-step 220, in sub-step 230, I/O stack 42 attempts to update the metadata 68, 72, 74 of the object entry 64 in the MDDB 62 to be the same as how the in-memory metadata 54, 58, 60 of the memory-resident storage object 50 was set in sub-step 220. However, if the I/O stack 42 is unable to make this update (e.g., for the same reason why it was not able to update the object entry previously in step 110), then the MDDB remediation operation of step 210 may fail, operation proceeding with step 240. Otherwise, operation proceeds with step 250 (if the object ID 52 was on the quarantine list 84) or step 250 (if the object ID 52 was not on the quarantine list 84 but the health level 70 was out-of-date with the DSS health level 82).

In step 240, since the MDDB remediation operation of step 210 failed, the storage object 50, object entry 64, and the associated storage feature (e.g., mirror 73) remains quarantined.

In step 250, since the MDDB remediation operation of step 210 succeeded, quarantine manager 76 removes the object ID 66 of the object entry 64 that is attempting to become dequarantined from the quarantine list 84. Thus, for example, the object ID 86 on the quarantine list 84 that matched the object ID 66 may be set to null. In some embodiments, the object IDs 86 on the quarantine list 84 are condensed so that all non-null object IDs 86 are contiguously-placed at the beginning of the quarantine list 84. In some embodiments, step 250 may be followed by step 260, although in other embodiments, even when the object ID 52 was on the quarantine list 84, step 260 may precede step 250.

In step 250, since the MDDB remediation operation of step 210 succeeded and since the health level 70 may be out-of-date with the DSS health level 82, quarantine manager 76 updates the health level 70 of the object entry 64 based on the DSS health level 82. In some embodiments, a health level 56 in the memory-resident storage object 50 is also updated.

In some embodiments, the health level 70 of the object entry 64 is set to be equal to the DSS health level 82, while in other embodiments the health level 70 is set to be 1 less than the DSS health level 82 or 1 more than the DSS health level 82.

This effectively completes the dequarantining of the storage entry 70. It should be understood, however, that just because a storage entry 70 is no longer quarantined does not necessarily mean that the storage feature that it represents is available for use. For example, if the validity flag 54, 68 is set to be false, the storage feature may remain offline until the storage feature can be fixed, but at that point the operation of the quarantine manager 76 is not used for controlling such access.

Figure 4:
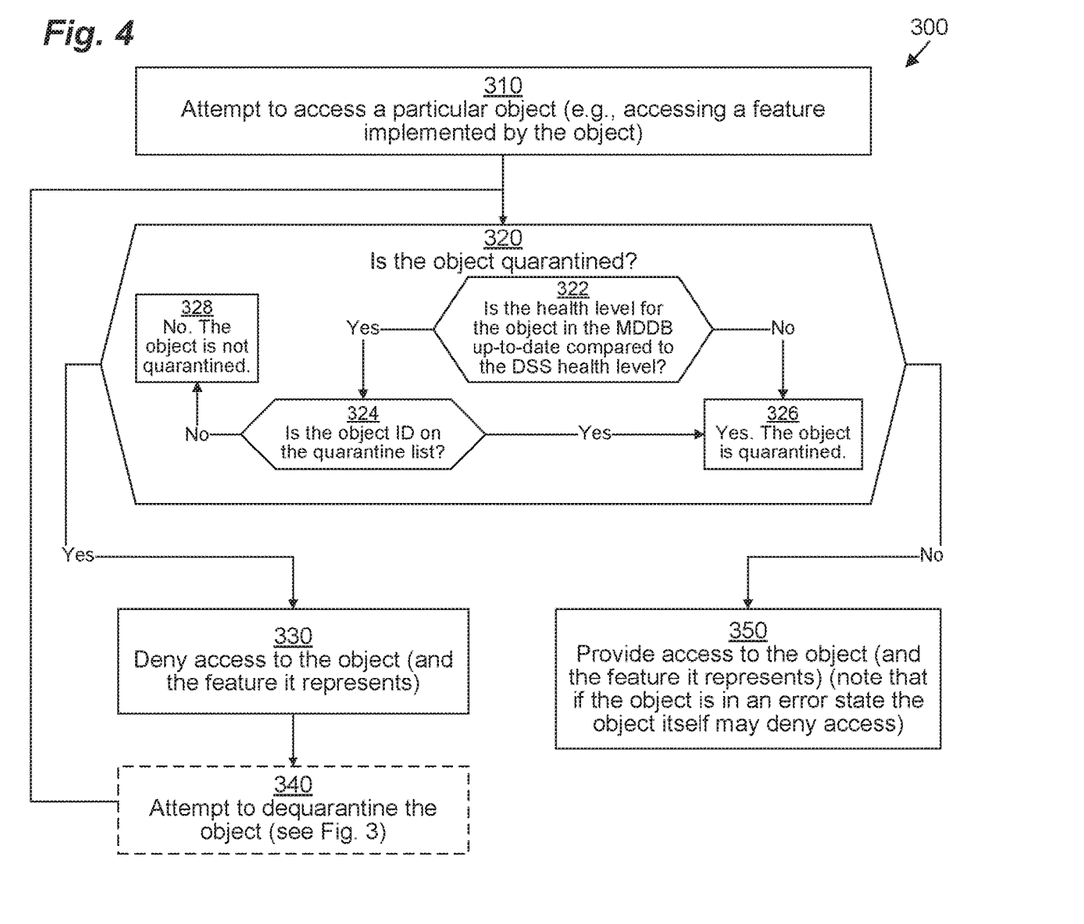
FIG. 4 is a flowchart depicting example methods according to various embodiments.

FIG. 4 illustrates an example method 300 performed by I/O stack 42 and quarantine manager 76 running on a DSS computing device 32 for controlling access to a storage feature implemented by a storage object 50 that corresponds to an object entry 64. It should be understood that one or more of the steps or sub-steps of method 300 may be omitted in some embodiments. Similarly, in some embodiments, one or more steps or sub-steps may be combined together or performed in a different order. Step 340 of method 300 marked with dashed lines may be deemed to be either optional or representative of an alternative embodiment. Method 300 is performed by computing device 32.

In step 310, I/O stack 42 attempts to access a particular storage object 50 that represents a particular storage feature. For example, a user (e.g., of a remote host) or a local application may want to store data on a mirror 73 represented by storage object 50(*a*). In some embodiments, step 310 may only be invoked for certain kinds of access. Thus, for example, if a user wishes to read from a mirror 73, then, since a read from a mirror does not involve modifying any metadata 54, 58, 60, 68, 72, 74, if the storage object 50(*a*) is already loaded in memory 40 operation may proceed as normal. However, if the storage object 50(*a*) is not yet loaded in memory 40 (meaning that it needs to be loaded from the MDDB 62 on persistent storage 38) or if the user wishes to write to the mirror 73 or make modifications to the settings of the mirror 73, then step 310 is invoked.

In response to step 310 being invoked, in step 320, quarantine manager 76 determines whether or not the storage object 50 is quarantined. Step 320 may include sub-steps 322-328.

In sub-step 322, quarantine manager determines whether or not the health level 70 (and/or the health level 56 in memory 40 in some embodiments) for the corresponding object entry 64 in the MDDB 62 is up-to-date compared to the DSS health level 82 stored in the special persistent memory portion 80. For example, in one embodiment, quarantine manager 76 checks whether or not the health level 70 is equal to the DSS health level 82, while in other embodiments, quarantine manager 76 instead checks whether or not the health level 70 is greater than (or, in other embodiments, less than) the DSS health level 82. If the check of sub-step 322 is affirmative, then operation proceeds with sub-step 324. Otherwise, operation proceeds with sub-step 326.

In sub-step 324, quarantine manager 76 determines whether or not the object ID 66 is listed on the quarantine list 84 in the special persistent memory portion 80. If the check of sub-step 324 is affirmative, then operation proceeds with sub-step 326. Otherwise, operation proceeds with sub-step 328.

In sub-step 326, which is performed either if sub-step 322 yields a negative result or if sub-step 324 yields an affirmative result, it is determined that the storage object 50 has been quarantined, so step 320 returns an affirmative result and operation proceeds with step 330. It should be understood that although sub-step 322 has been depicted as preceding sub-step 324, the order in which sub-steps 322, 324 is performed could be reversed.

In sub-step 328, which is performed either if sub-step 322 yields an affirmative result and sub-step 324 yields a negative result, it is determined that the storage object 50 has not been quarantined, so step 320 returns a negative result and operation proceeds with step 350.

In step 330, which is performed when it has been determined that the storage object 50 has been quarantined, quarantine manager 76 denies access to the storage object 50 so that I/O stack 42 is not able to provide access (e.g., write access or modify access in the case of mirror 73) to the associated storage feature. In some embodiments, this denial is temporary, and it may immediately be followed by step 340 in which there is an attempt to dequarantine the storage object 50 (see above in connection with method 200 of FIG. 3), in which case operation may loop back to step 320.

In step 350, which is performed when it has been determined that the storage object 50 has not been quarantined, quarantine manager 76 provides access to the storage object 50 so that I/O stack 42 is not able to provide access (e.g., write access or modify access in the case of mirror 73) to the associated storage feature. It should be noted, however, that just because a storage object 50 or storage entry 70 is not quarantined does not necessarily mean that the storage feature that it represents is available for use. For example, if the validity flag 54, 68 is set to be false, the storage feature may remain offline until the storage feature can be fixed, but at that point the operation of the quarantine manager 76 is not used for controlling such access.

Thus, techniques have been presented for implementing a more scalable approach to keeping track of the metadata validity of persistently-stored metadata 68, 72, 74 for object entries 64 associated with storage objects 50 that represent respective storage features. In contrast with prior approaches, improved techniques store a list 84 of only the invalid (or quarantined) object entries 64 rather than all objects regardless of validity of their metadata 68, 72, 74. Under normal circumstances, only a small number of storage object entries 64 are quarantined at any given time, as the system generally takes steps to repair the quarantined object entries 64 in the normal course of operation. Thus, the number of quarantined object entries 64 tends to be small, barring some catastrophic system failure. Only a small amount of expensive triple-mirrored persistent storage 80 is needed for storing information about just a few quarantined object entries 64. In some examples, failures of a large number of storage objects 50 are addressed by providing a system-wide health level 82 to indicate many failures, which would be too many to fit in the small amount of triple-mirrored storage 80 available. For example, if a large number of failures is observed, the health level 82 may be set to a value that signals a catastrophic failure, which would mean that every object on the system is suspect. The improved approach thus efficiently addresses the usual case, where only a small number of failures occur, and provides a health level 82 to address the unusual case, where many failures occur. The improved approach is thus efficient and cost-effective without sacrificing functionality.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method performed by processing circuitry of a data storage system (DSS) for selectively providing access to multiple storage features of the DSS represented by respective memory-resident storage objects, the method comprising:
    receiving a first request to access a first storage feature, and, in response, (a) providing access to the first storage feature, including making a first change to metadata describing the first storage feature in its memory-resident storage object, and (b) storing the first changed metadata within a metadata database (MDDB) on first persistent storage of the DSS;
    receiving a second request to access a second storage feature, and, in response:
        providing access to the second storage feature including making a second change to metadata describing the second storage feature in its memory-resident storage object,
        making an attempt to store the second changed metadata within the MDDB on the first persistent storage, the attempt failing, and
        in response to the attempt failing, storing an identifier of the storage object representing the second storage feature to a quarantine list on second persistent storage of the DSS distinct from the first persistent storage; and
    subsequently, receiving a third request to access the second storage feature, and, in response:
        finding that the quarantine list identifies the storage object representing the second storage feature and
        in response to finding, denying access to the second storage feature due to it being quarantined.

2. The method of claim 1 wherein the method further comprises:
    subsequently, receiving a fourth request to access a third storage feature not listed on the quarantine list, and, in response:
        providing access to the third storage feature including making a third change to metadata describing the third storage feature in its memory-resident storage object,
        making another attempt to store the third changed metadata within the MDDB on the first persistent storage, the other attempt failing,
        in response to the other attempt failing, making a quarantine attempt to store an identifier of the storage object representing the third storage feature to the quarantine list on the second persistent storage, the quarantine attempt failing due to a number of identifiers already on the quarantine list having reached a predetermined maximum value, and
        in response to the quarantine attempt failing, updating a DSS health value stored in the second persistent storage to thereby quarantine all of the multiple storage features of the DSS; and
    subsequently, receiving a fifth request to access a fourth storage feature not listed on the quarantine list, and, in response:
        comparing a last-recorded health value, stored in the MDDB in connection with the fourth storage feature, with the DSS health value, stored in the second persistent storage,
        in response to comparing, determining that the last-recorded health value stored in the MDDB in connection with the fourth storage feature indicates that it is unknown whether metadata of the fourth storage feature within the MDDB is up-to-date, and
        in response to determining, denying access to the fourth storage feature due to it being quarantined.

3. The method of claim 2 wherein the method further comprises, in response to denying access to the fourth storage feature due to it being quarantined:
    performing a remediation operation to update the metadata of the fourth storage feature within the MDDB to accurately reflect a current state of the fourth storage feature; and
    in response to performing the remediation operation, updating the last-recorded health value stored in the MDDB based on the DSS health value stored in the second persistent storage to indicate that the metadata of the fourth storage feature within the MDDB is up-to-date and subsequently providing access to the fourth storage feature.

4. The method of claim 3,
wherein the fourth storage feature is a mirroring feature applied to a primary logical disk and a secondary logical disk such that data written to the primary logical disk is mirrored to the secondary logical disk in normal operation; and
wherein performing the remediation operation includes:
reading data from the primary logical disk;
reading data from the secondary logical disk;
performing a comparison operation, the comparison operation returning a true value in response to the data read from the primary logical disk and the data read from the secondary logical disk matching and a false value in response to the data read from the primary logical disk and the data read from the secondary logical disk not matching; and
selectively updating a valid state flag for the fourth storage feature stored within the MDDB to match the value returned by the comparison operation.

5. The method of claim 2,
wherein the third storage feature is a mirroring feature applied to a primary logical disk and a secondary logical disk such that data written to the primary logical disk is mirrored to the secondary logical disk in normal operation; and
wherein providing access to the third storage feature includes sending a write command to the primary logical disk to also be mirrored to the secondary logical disk, mirroring to the secondary logical disk failing to successfully complete;
wherein making the third change to metadata describing the third storage feature in its memory-resident storage object includes updating a valid state flag for the third storage feature within its memory-resident storage object to be false instead of a previous value of true; and
wherein making the third attempt includes attempting to update a copy of the valid state flag for the third storage feature stored within the MDDB to be false instead of a previous value of true.

6. The method of claim 2 wherein the maximum value is within a range of 4 to 16.

7. The method of claim 1,
wherein the first storage feature is a mirroring feature applied to a primary logical disk and a secondary logical disk such that data written to the primary logical disk is mirrored to the secondary logical disk in normal operation; and
wherein providing access to the first storage feature includes sending a write command to the primary logical disk to also be mirrored to the secondary logical disk, mirroring to the secondary logical disk failing to successfully complete;
wherein making the first change to metadata describing the first storage feature in its memory-resident storage object includes updating a valid state flag for the first storage feature stored within the MDDB to be false instead of a previous value of true; and
wherein storing the first changed metadata within the MDDB on the first persistent storage includes successfully updating a copy of the valid state flag for the first storage feature stored within the MDDB to be false instead of a previous value of true.

8. The method of claim 1,
wherein the second storage feature is a mirroring feature applied to a primary logical disk and a secondary logical disk such that data written to the primary logical disk is mirrored to the secondary logical disk in normal operation; and
wherein providing access to the second storage feature includes sending a write command to the primary logical disk to also be mirrored to the secondary logical disk, mirroring to the secondary logical disk failing to successfully complete;
wherein making the second change to metadata describing the second storage feature in its memory-resident storage object includes updating a valid state flag for the second storage feature stored within the MDDB to be false instead of a previous value of true; and
wherein making the attempt to store the second changed metadata within the MDDB on the first persistent storage includes attempting to update a copy of the valid state flag for the second storage feature stored within the MDDB to be false instead of a previous value of true.

9. The method of claim 1 wherein the method further comprises, in response to denying access to the second storage feature due to it being quarantined:
performing a remediation operation to update the metadata of the second storage feature within the MDDB to accurately reflect a current state of the second storage feature; and
in response to performing the remediation operation, removing the identifier of the storage object representing the second storage feature from the quarantine list on the second persistent storage and subsequently providing access to the second storage feature.

10. The method of claim 9,
wherein the second storage feature is a mirroring feature applied to a primary logical disk and a secondary logical disk such that data written to the primary logical disk is mirrored to the secondary logical disk in normal operation; and
wherein performing the remediation operation includes:
reading data from the primary logical disk;
reading data from the secondary logical disk;
performing a comparison operation, the comparison operation returning a true value if the data read from the primary logical disk and the data read from the secondary logical disk match and a false value if the data read from the primary logical disk and the data read from the secondary logical disk do not match; and
selectively updating a valid state flag for the second storage feature stored within the MDDB to match the value returned by the comparison operation.

11. The method of claim 1 wherein the second persistent storage of the DSS is triple-mirrored persistent storage.

12. The method of claim 1 wherein receiving the third request to access the second storage feature is performed after a reboot of the processing circuitry of the DSS and storing the identifier of the storage object representing the second storage feature to the quarantine list on the second persistent storage is performed prior to the reboot of the processing circuitry of the DSS.

13. A computer program product comprising a non-transitory computer-readable storage medium storing a set of instructions, which, when performed by a processing circuitry of a data storage system (DSS), cause the DSS to selectively provide access to multiple storage features of the DSS represented by respective memory-resident storage objects by:

receiving a first request to access a first storage feature, and, in response, (a) providing access to the first storage feature, including making a first change to metadata describing the first storage feature in its memory-resident storage object, and (b) storing the first changed metadata within a metadata database (MDDB) on first persistent storage of the DSS;

receiving a second request to access a second storage feature, and, in response:

providing access to the second storage feature including making a second change to metadata describing the second storage feature in its memory-resident storage object,     making an attempt to store the second changed metadata within the MDDB on the first persistent storage, the attempt failing, and     in response to the attempt failing, storing an identifier of the storage object representing the second storage feature to a quarantine list on second persistent storage of the DSS distinct from the first persistent storage; and subsequently, receiving a third request to access the second storage feature, and, in response:

finding that the quarantine list identifies the storage object representing the second storage feature and     in response to finding, denying access to the second storage feature due to it being quarantined.

14. A data storage system (DSS) comprising:

a set of persistent storage device that provide first persistent storage;

second persistent storage distinct from the first persistent storage; and processing circuitry and memory communicatively-coupled to the first persistent storage and to the second persistent storage, the processing circuitry and memory being configured to selectively provide access to multiple storage features of the DSS represented by respective memory-resident storage objects by:

receiving a first request to access a first storage feature, and, in response, (a) providing access to the first storage feature, including making a first change to metadata describing the first storage feature in its memory-resident storage object, and (b) storing the first changed metadata within a metadata database (MDDB) on the first persistent storage;

receiving a second request to access a second storage feature, and, in response:

providing access to the second storage feature including making a second change to metadata describing the second storage feature in its memory-resident storage object,     making an attempt to store the second changed metadata within the MDDB on the first persistent storage, the attempt failing, and     in response to the attempt failing, storing an identifier of the storage object representing the second storage feature to a quarantine list on second persistent storage; and subsequently, receiving a third request to access the second storage feature, and, in response:

finding that the quarantine list identifies the storage object representing the second storage feature and     in response to finding, denying access to the second storage feature due to it being quarantined.

15. The DSS of claim 14 wherein the second persistent storage is triple-mirrored persistent storage.

\* \* \* \* \*